Jan. 30, 1951     S. NOODLEMAN     2,539,857
SINGLE PHASE REVERSIBLE MOTOR
Filed July 9, 1949
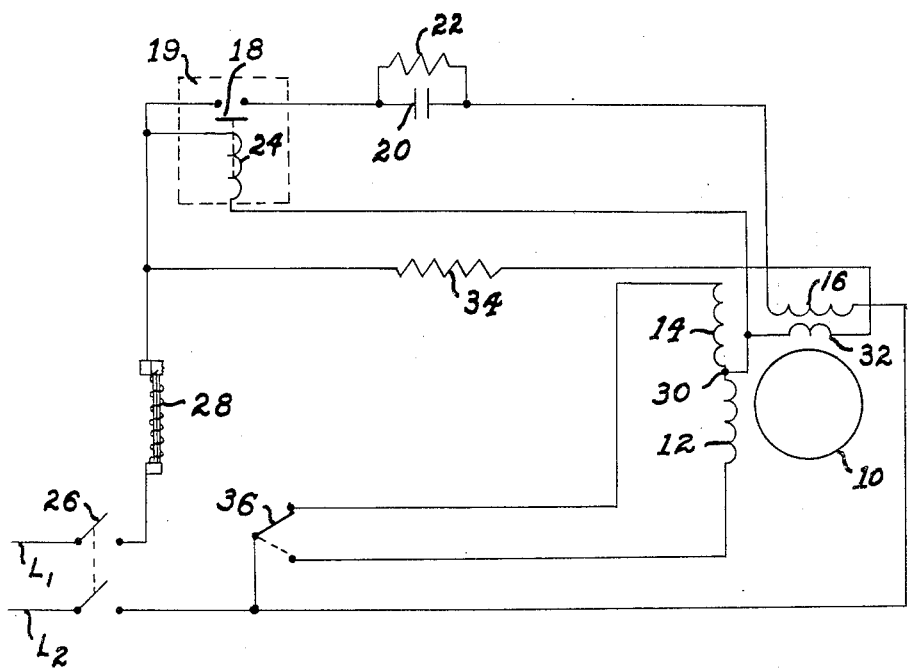
INVENTOR.
SAMUEL NOODLEMAN,
BY Dybvig & Dybvig.
HIS ATTORNEYS.

Patented Jan. 30, 1951

2,539,857

UNITED STATES PATENT OFFICE 2,539,857

SINGLE-PHASE REVERSIBLE MOTOR

Samuel Noodleman, Dayton, Ohio, assignor to Louis R. Mahrt and D. Robert Laughter as trustees for the Standard Dayton Corporation, Dayton, Ohio, a corporation of Ohio Application July 9, 1949, Serial No. 103,897

2 Claims. (Cl. 318—207)

1

This invention relates to a single phase reversible motor having improved means whereby the direction of rotation of the motor may be instantly reversed.

This invention is an improvement over the invention shown and claimed in my earlier Patent No. 2,442,208.

An object of this invention is to provide an electromagnetic control device that may be used in controlling the starter windings of a split phase motor, such that upon the current being interrupted through the motor at the start of the motor reversing operation, the starter winding will be connected into the circuit in such a manner that it first functions as a brake in arresting the rotation of the motor and then functions as a conventional starter winding aiding the main winding in bringing the rotor up to speed in the opposite direction.

Another object of this invention is to provide an electromagnetic control device that is in part energized from a winding linking the flux of the motor directly under the phase or starter winding.

Another object of this invention is to provide an improved automatic switching mechanism that open-circuits the starter winding when the motor attains a predetermined speed, said automatic switching mechanism closing the circuit through the starter winding when the relative phase relation of the main and starter windings are reversed irrespective of the motor speed.

Another object of this invention is to provide an improved single phase motor arrangement which makes it possible to reverse the direction of rotation of the motor by merely reversing the polarity of the windings with respect to each other.

Still another object of this invention is to provide a control which operates such that if there is a momentary interruption of the current due to abnormal conditions rather than due to a desire to actually reverse the direction of rotation of the motor, the motor will not reverse its direction of rotation.

Still another object of this invention is to provide a motor reversing arrangement which makes it possible to use a single pole, double throw microswitch for instantly reversing the direction of rotation of the motor.

Other objects and advantages reside in the construction of parts, the combination thereof and the mode of operation, as will become more apparent from the following description.

In the drawing, the sole figure of the drawing

2 shows a schematic wiring diagram for use in illustrating a preferred embodiment of my invention.

Referring now to the drawing, reference numeral 10 designates the rotor of a split phase motor having first and second main windings 12 and 14 respectively which are wound in opposition to one another and only one of which is intended to be energized at any one time. Reference numeral 16 designates the phase or starter winding which, for the purpose of illustration, has been shown as a starter winding of the type that is opened when the motor attains a predetermined speed. A pick-up coil 32 has been provided which is disposed directly beneath the phase winding so as to link a portion of the flux set up by the phase winding.

The switch 18 has been provided in the starter winding circuit for opening the starter winding when the rotor attains the desired speed, as will be explained more fully hereinafter. For purposes of illustration, a condenser 20 has been connected in series with the starter winding for providing a phase displacement or leading current through the starter winding. A high impedance resistor 22 has been connected across the condenser 20 for discharging the condenser in accordance with practice which is now well-known. Instead of a condenser, a resistor or other suitable impedance for producing the desired phase displacement may be used. The motor is turned "off" and "on" by the main power switch 26 located in the main power line, as shown. The control switch 18 for the phase winding 16 is actuated by a solenoid or relay coil 24 which is connected across pick-up coil 32 and the resistance 34. The one side of the coil 24 is connected to the power line $L_1$ through the main switch 26 and the protective thermostat 28 and the other side is connected to the terminal 30 provided between the two main windings.

The pick-up coil 32 is disposed directly beneath the phase winding 16 so as to link a portion of the flux set up by the phase winding and so as to act much the same in both directions of rotation of the motor irrespective of the polarity established by one or the other of the main windings. It has been found that by thus placing the pick-up coil under the phase winding rather than under one of the main windings, it is possible to obtain better reversing characteristics over a wider voltage range. It will be noted that the circuit arrangement is such that the current flowing through the main winding must also flow through the pick-up coil 32 and the resistance 34, whereby one obtains a leading voltage which better bucks the voltage of the pick-up coil which is placed under the phase winding. By virtue of this arrangement, very positive results are obtained. It will also be noted that the phase winding is always connected directly across the line whenever it is in circuit.

The resistance 34 shown in the drawing and referred to in the claims is intended to represent the electrical resistance of the pick-up coil circuit and consequently all of the resistance 34 may actually be in the windings of the pick-up coil per se, or, if desired, part of the resistance may be in the pick-up coil and part in the form of a separate resistance element arranged in series with a pick-up coil.

The current flowing to the main field winding is required to flow through the resistance 34 in the pick-up coil circuit and the resultant voltage drop caused by this current flow may be represented by a voltage vector which is in opposition to the voltage vector representing the voltage generated or induced in the pick-up coil 32 located under the phase winding.

The reactance of the pick-up coil is purposely made great enough to cause the sum of the vector voltages applied to the relay coil 24 to balance out when the motor comes up to speed so as to open the switch 18 and thereby de-energize the phase winding.

For purposes of illustrating my invention, I have shown the control applied to a motor having two main windings wound on opposite polarity, whereas the control could be used in a motor having only one main winding and in which a double throw, multiple pole switch is used for reversing the polarity in the single main winding. One of the advantages of using two main windings of opposite polarity is that it is possible to use a single pole, double throw microswitch 36 for reversing the direction of rotation of the motor.

The protective thermostat 28 is arranged in the one power line ahead of the control relay 19, with the result that all of the current flowing to the motor is required to pass through the thermostat 28. The thermostat 28 is of the type which responds to excessive ambient temperature or excessive current flow to the motor or to a combination of both. Thermostats of this type are now well-known and need no further description.

Summary of operation

The motor is started by closing the switch 26 which is arranged in the main power lines as shown. With the reversing switch 36 arranged in the position in which it is shown in the figure, the main winding 14 and the phase winding 16 will both be energized when the switch 26 is first closed and until the motor speed approaches normal running speed, at which time the relay switch 18 will automatically open and disconnect the phase winding 16 so that the motor will continue to operate in the direction called for whenever the main winding 14 is energized.

The direction of rotation of the motor may be instantly reversed by moving the reversing switch 36 from its full line position to its dotted line position. At the instant that the reversing switch 36 is moved from the full line position to the dotted line position, the field winding 14 is deenergized and the field winding 12 is energized so as to produce a field of opposite polarity to that formerly produced by the field winding 14. The current flowing to the main field winding will momentarily cause a voltage vector unbalance in the pick-up coil circuit which will cause the switch 18 to close so as to energize the phase winding 16. Energization of the phase winding helps to bring the motor to a stop and then helps to bring the motor back up to speed in the reverse direction before being cut out of the circuit by the solenoid operated switch 18 and this energization of the phase winding continues to hold the relay closed so long as the phase winding and the main winding combine to provide a rotating field which opposes the direction of rotation of the rotor. When the switch 18 first closes, the vector sum of the voltages applied to the switch operating relay 24 is such that sufficient current flows through the coil to hold the switch closed, but as the direction of rotation of the motor changes, the vector sum of the voltages is such that the switch opens when the speed of the rotor approaches normal running speed due to the bucking action produced by the voltage of the pick-up coil 32. The motor may subsequently be stopped simply by opening the main power switch 36. Upon reclosing the power switch 26, the motor will start up in the particular direction of operation for which the switch 36 is set.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a split phase motor; a first field winding; a second field winding arranged to produce a polarity opposite the polarity of said first winding; a phase winding; first switch means for selectively connecting either one of said first or second field windings to a source of power; and means for controlling the flow of current through said phase winding; said last named means including a relay, a pick-up coil circuit including a resistance element and including a pick-up coil arranged adjacent said phase winding for linking the phase winding flux, and means for connecting said pick-up coil circuit across said relay whereby changes in the voltage across said pick-up coil circuit operate said relay.

2. In combination, a split phase motor provided with a pair of main field windings of opposite polarity and a phase winding, means arranged in series with said phase winding for providing phase displacement between the current flowing through said phase winding and any of the current flowing through either of said field windings, a source of power, means for connecting said phase winding to said source of power including a control switch, a solenoid for operating said control switch, means for selectively connecting one or the other of said main field windings to said source of power, a pick-up coil circuit including a resistance element and a pick-up coil disposed beneath said phase winding and linking a portion of the motor flux, and means for impressing the resultant voltage vector representing the product of the current and the resistance in the pick-up coil circuit and the voltage generated in the pick-up coil upon terminals of the solenoid to open-circuit the phase winding when the motor approaches normal running speed.

SAMUEL NOODLEMAN.

REFERENCES CITED

The following references are of record in the file of this patent:

UNITED STATES PATENTS

| Number | Name | Date |
|---|---|---|
| 1,913,208 | Morrill | June 6, 1933 |
| 1,991,035 | Werner | Feb. 12, 1935 |
| 1,991,036 | Werner | Feb. 12, 1935 |
| 1,991,038 | Werner | Feb. 12, 1935 |
| 1,991,039 | Werner | Feb. 12, 1935 |
| 1,991,040 | Werner | Feb. 12, 1935 |
| 1,991,042 | Werner | Feb. 12, 1935 |
| 2,442,208 | Noodleman | May 25, 1948 |
| 2,442,207 | Noodleman | May 25, 1948 |